US009162361B2

(12) United States Patent
Park

(10) Patent No.: US 9,162,361 B2
(45) Date of Patent: Oct. 20, 2015

(54) GAP AND HEIGHT DIFFERENCE MEASUREMENT SYSTEM FOR VEHICLE AND CONTROL METHOD OF THE SAME

(71) Applicant: Hyundai Motor Company, Seoul (KR)

(72) Inventor: Sangkyu Park, Seongnam-Si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/137,668

(22) Filed: Dec. 20, 2013

(65) Prior Publication Data

US 2014/0297036 A1    Oct. 2, 2014

(30) Foreign Application Priority Data

Mar. 26, 2013  (KR) .................. 10-2013-0032180

(51) Int. Cl.
*G05B 19/00* (2006.01)
*B25J 9/16* (2006.01)

(52) U.S. Cl.
CPC ..... *B25J 9/1694* (2013.01); *G05B 2219/39084* (2013.01); *G05B 2219/40556* (2013.01); *G05B 2219/45064* (2013.01); *Y10S 901/47* (2013.01)

(58) Field of Classification Search
CPC .... G06N 3/008; A61B 19/22; A61B 19/5212; B25J 13/085; G05B 2219/45083
USPC .................. 700/245, 248, 250, 252, 256, 258
See application file for complete search history.

(56) References Cited

U.S. PATENT DOCUMENTS

| 4,654,949 | A | * | 4/1987 | Pryor ......................... 29/407.04 |
| 4,852,237 | A | * | 8/1989 | Tradt et al. ................. 29/407.05 |
| 5,010,634 | A | * | 4/1991 | Uemura et al. ............ 29/407.05 |
| 8,437,535 | B2 | * | 5/2013 | Boca et al. .................... 382/154 |

FOREIGN PATENT DOCUMENTS

| JP | 6-246592 A | 9/1994 |
| JP | 9-318337 A | 12/1997 |

* cited by examiner

*Primary Examiner* — Ian Jen
(74) *Attorney, Agent, or Firm* — Morgan, Lewis & Bockius LLP

(57) ABSTRACT

A gap/height difference measurement system for a vehicle may include a reflection light sensing unit on a the transportation conveyor line and sensing reflection light reflected from the vehicle body transported depending on illuminance of an illumination, a measurement robot measuring the gap and the height difference between the vehicle body and each panel that move while being installed at both sides of the transportation conveyor line in a width direction of the vehicle body at one side spaced from the reflection light sensing unit in a movement direction of the vehicle body, and a controller receiving a signal sensed by the reflection light sensing unit and comparing the received signal with a predetermined value to control the illuminance of the illumination and outputting a specification depending on a vehicle type of the vehicle body transported to the measurement robot to control the measurement robot.

14 Claims, 2 Drawing Sheets

GAP AND HEIGHT DIFFERENCE MEASUREMENT SYSTEM FOR VEHICLE AND CONTROL METHOD OF THE SAME

CROSS-REFERENCE TO RELATED APPLICATION

The present application claims priority to Korean Patent Application No. 10-2013-0032180 filed on Mar. 26, 2013, the entire contents of which is incorporated herein for all purposes by this reference.

BACKGROUND OF THE INVENTION

1. Field of the Invention

The present invention relates to a gap and a height difference measurement system for a vehicle and a control method of the same that allow a gap and a height difference between each mounted panel and a vehicle body to be accurately measured regardless of a color and a gloss of the vehicle body in which assembling a roof, a hood, a door, and a trunk lead is completed 2. Description of Related Art In general, various panels such as a roof, a hood, a door, and a trunk lead are attached to a vehicle body of a vehicle.

Herein, each panel attached to the vehicle body should be mounted to prevent a gap or a height difference from a neighboring panel or the vehicle body and to this end, a worker verifies an inspection of a mounting state of various panels through a gauge or visual inspection in the related art.

As such, since the worker cannot accurately inspect whether various panels are accurately mounted or various panels are erroneously mounted because manual work inspection and visual inspection methods through a gauge depend on a worker's judgment reference of a quality ability and a worker's working method, reliability deteriorates and uniform quality management for the vehicle body is difficult.

In order to prevent the problems, an automated gap/height difference measurement system for a vehicle has been applied through a method of measuring a gap/height difference between the vehicle body and various panels by using a robot mounted with a camera or a sensor in recent years.

However, in the automated gap/height measurement system in the related art, when a vehicle type is to be changed or when a color and a gloss of the vehicle body are changed, a degree in which the vehicle body absorbs or reflects an illumination varies, and as a result, automatic measurement can become impossible and measurement reliability can deteriorate.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a gap/height difference measurement system for a vehicle and a control method in the same that automatically measure a gap and a height difference between each panel and a vehicle body which are mounted with accuracy regardless of a vehicle type, and a color and a gloss of the vehicle body by measuring the gap/height difference between the vehicle body and the panel by automatically controlling the brightness of an illumination depending on the color and the gloss of the vehicle body in which assembling a roof, a hood, a door, and a trunk lead are is completed to improve measurement reliability and be commonly applied to various vehicle types.

In an aspect of the present invention, a gap/height difference measurement system for a vehicle, which is installed on a transportation conveyor line through which a vehicle body, of which each panel is assembled is transported to measure a gap and/or a height difference between the each panel and the vehicle body may include a reflection light sensing unit sensing reflection light reflected from the vehicle body transported depending on illuminance of an illumination, a measurement robot measuring the gap and/or the height difference between the vehicle body and the each panel, and a controller receiving a signal sensed by the reflection light sensing unit and comparing the signal with a predetermined value to control the illuminance of the illumination, and outputting a specification depending on a vehicle type of the vehicle body transported to the measurement robot to control the measurement robot when there is no difference between the predetermined value and the signal.

The reflection light sensing unit may include a mounting frame installed at one side of the transportation conveyor line, and at least one sensor mounted on an interior of the mounting frame to correspond to the vehicle body, and receiving the reflection light reflected from the vehicle body and outputting the signal to the controller.

The at least one sensor may include a light receiving sensor, and is mounted on each of an upper inner part and both lateral parts of the mounting frame to correspond to a top and both lateral surfaces of the vehicle body, respectively.

The illumination may include a laser illumination that radiates laser light to the vehicle body.

The measurement robot may have a vision sensor mounted on a front end thereof, and outputting a signal sensed by the vision sensor to the controller to measure the gap and/or the height difference between the vehicle body and the each panel.

The controller is configured to compare the signal output from the vision sensor with a predetermined value and measures the gap and the height difference between the vehicle body and the each panel to be measured to judge whether the gap and/or the height difference is normal.

The laser type illumination adjusts its own laser density.

In another aspect of the present invention, a control method of a gap/height difference measurement system for a vehicle, which is installed on a transportation conveyor line through which a vehicle body of which each panel is assembled is transported to measure a gap and/or a height difference between the each panel and the vehicle body, may include a step (a) of recognizing the vehicle body depending on information transmitted to a controller when the vehicle body is transported on the transportation conveyor line and sensing vehicle body brightness through reflection light reflected depending on illuminance of an illumination from the vehicle body through a sensor of a reflection light sensing unit to output a signal to the controller, a step (b) of comparing the signal output from the sensor of the reflection light sensing unit with a predetermined value and judging a difference between predetermined reference brightness and the vehicle body brightness to control the illuminance of the illumination, and a step (c) of determining the gap and/or the height difference between the vehicle body transported on the transportation conveyor line and the each panel by using a measurement robot depending on the difference between the reference brightness and the vehicle body brightness, and terminating a control.

The step (a) may include conveying the vehicle body by the transportation conveyor line, recognizing a vehicle type of the vehicle body through the information received by the controller, and sensing the reflection light reflected from the vehicle body depending on the illuminance of the illumination through the reflection light sensing unit and outputting the signal of the reflection light to the controller.

The step (b) may include judging the difference between the predetermined reference brightness and the vehicle body brightness from the signal output from the reflection light sensing unit, controlling the illuminance of the illumination when there is the difference between the predetermined reference brightness and the vehicle body brightness, and sensing the reflection light reflected from the vehicle body through the reflection light sensing unit and outputting a sensed reflection light to the controller when the step (b) is completed again.

The step (c) may include judging that measurement preparation is completed when there is no difference between the predetermined reference brightness and the vehicle body brightness measured through the reflection light sensing unit by the controller, and determining the gap and/or the height difference between the vehicle body and the each panel transported on the transportation conveyor line by actuating the measurement robot, and terminating the control.

The illumination may include a laser illumination that radiates laser light to the vehicle body.

The sensor of the reflection light sensing unit may include a light receiving sensor sensing the reflection light reflected from the vehicle body.

The measurement robot may have a vision sensor mounted on a front end thereof, and outputs a signal sensed by the vision sensor to the controller to measure the gap and/or the height difference between the vehicle body and the each panel.

According to the gap/height difference measurement system for a vehicle and the control method thereof according to the exemplary embodiments of the present invention, the brightness of the illumination is automatically controlled depending on the vehicle type, the color, and the gloss of the vehicle body in which assembling the various panels of the roof, the hood, the door, and the trunk lead is completed prevent generation of diffused reflection and a shortage phenomenon of a light intensity by a difference in illuminance of the illumination, thereby automatically measuring the gaps/height differences between the vehicle body and the respective panels, and as a result, measurement reliability may be improved by automatically and accurately measuring the gaps and the height differences between the vehicle body and the respective panels which are mounted regardless of the vehicle type, and the color and gloss of the vehicle body.

Further, the present invention may be commonly applied to various vehicle types regardless of the vehicle type, the color, and the gloss, and the gap/height difference is automatically measured without stopping the vehicle body that moves through the transportation conveyor line, and as a result, productivity may be improved by shortening a measurement time.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
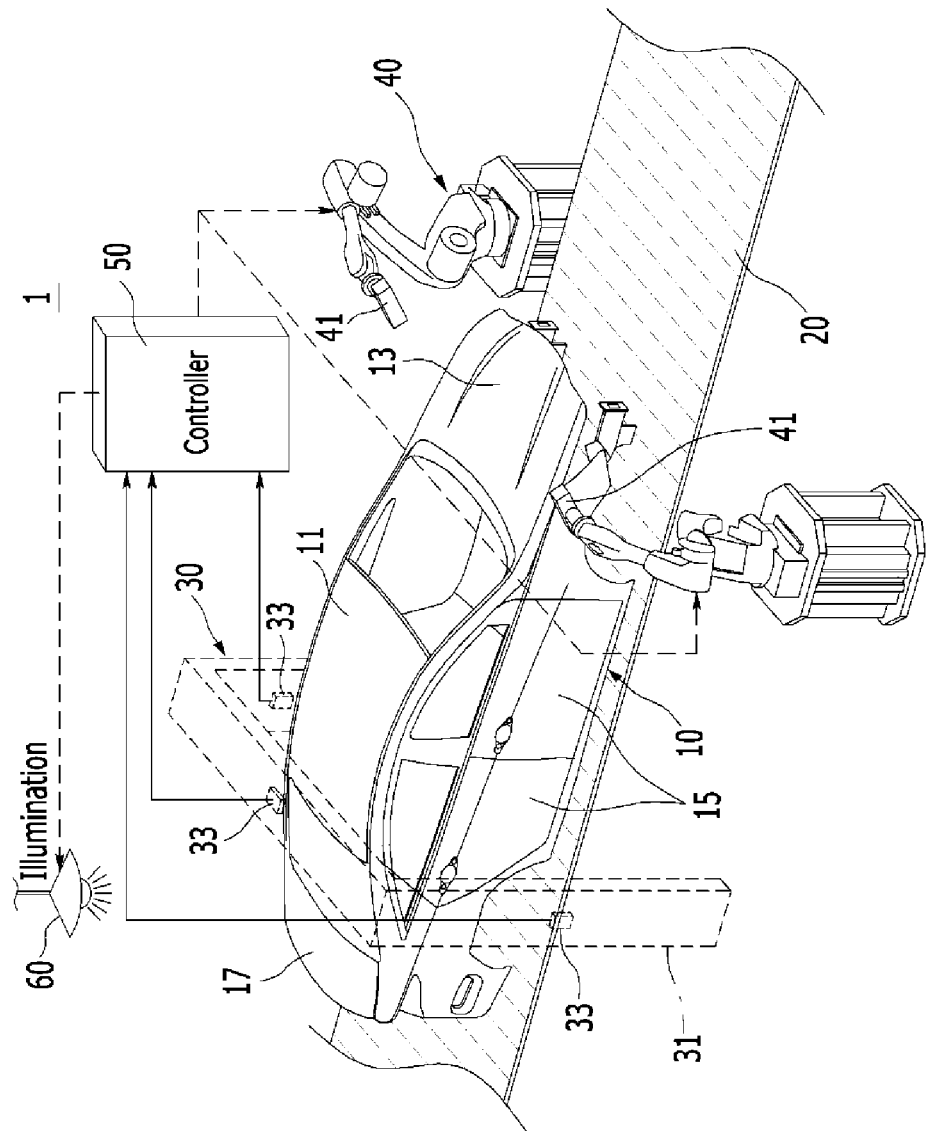
FIG. 1 is a schematic diagram of a cap/height difference measurement system for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Prior to this, since configurations disclosed in exemplary embodiments and illustrated in drawings are just the most preferable exemplary embodiment and represent the whole technical spirit of the present invention it should be appreciated that various equivalents and modified examples that can substitute the configurations can be made at this filing time.

Figure 2:
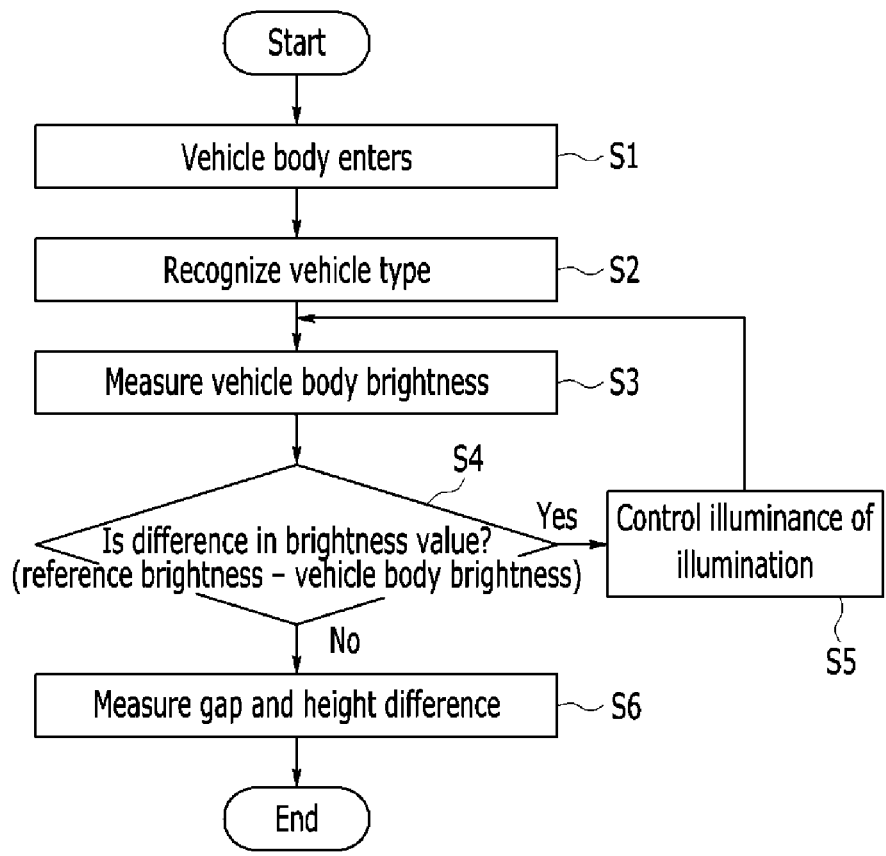
FIG. 2 is a control flowchart for describing a control method of a gap/height difference measurement system for a vehicle according to another exemplary embodiment of the present invention.

FIG. 1 is a schematic diagram of a gap/height difference measurement system for a vehicle according to an exemplary embodiment of the present invention and FIG. 2 is a control flowchart for describing a control method of a gap/height difference measurement system for a vehicle according to another exemplary embodiment of the present invention.

Referring to the figures, a gap/height difference measurement system 1 for a vehicle and a control method thereof according to exemplary embodiments of the present invention measure gaps/height differences between a vehicle body 10 and respective panels 11, 13, 15, and 17 by automatically controlling the brightness of an illumination depending on a color and a gloss of the vehicle body 10 in which assembling a roof 11, a hood 13, a door 15, and a trunk lead 17 is completed.

Accordingly, in the present patent, the gaps and the height differences between the respective panels 11, 13, 15, and 17 and the vehicle body 10 which are mounted are automatically and accurately are measured regardless a vehicle type, and a color and a gloss of the vehicle body 10 to improve measurement reliability and be commonly to various vehicle types.

To this end, in the gap/height difference measurement system 1 for a vehicle according to the exemplary embodiment of the present invention, the vehicle body 10 in which the assembling the respective panels 11, 13, 15, and 17 of the roof 11, the hood 13, the door 15, and the trunk lead 17 is completed is installed on a transportation conveyor line 20 to be configured to include a reflection light sensing unit 30, a measurement robot 40, and a controller 50 so as to measure the gaps/height differences between the respective panels 11, 13, 15, and 17 and the vehicle body 10, as illustrated in FIG. 1.

First, the reflection light sensing unit 30 is installed in a workplace on the transportation conveyor line 20 and senses reflection light reflected from the vehicle body 10 transported depending on illuminance of an illumination 60.

The illumination 60 may be constituted by a laser illumination that radiates laser light to the vehicle body 10.

Herein, the reflection light sensing unit 30 may include a mounting frame 31 installed in the workplace at one side of the transportation conveyor line 20 and at least one sensor 33 that is mounted on the inside of the mounting frame 31 to correspond to the vehicle body 10 and outputs a measured signal to the controller 50 by receiving the reflection light reflected from the vehicle body 10.

In the exemplary embodiment, the sensor 33 is constituted by three light receiving sensors and may be mounted on an upper inner part and both lateral parts of the mounting frame to correspond to the top and both lateral surfaces of the vehicle body 10, respectively.

The measurement robot 40 measures the gaps and the height differences between the vehicle body 10 and the respective panels 11, 13, 15, and 17 that are installed at both sides of the transportation conveyor line 20 to move in a width direction of the vehicle body 10 at one side that is spaced apart from the reflection light sensing unit 30 in a movement direction of the vehicle body 10.

A vision sensor 41 is mounted on a front end of the measurement robot 40, which outputs a signal sensed by the vision sensor 41 to the controller 50 to measure the gaps/height differences between the vehicle body 10 and the respective panels 11, 13, 15, and 17.

In addition, the controller 50 receives the signal sensed by the reflection light sensing unit 30 and compares the received signal with a predetermined value to control the illuminance of the illumination 60 and outputs a specification depending on the vehicle type of the vehicle body 10 transported to the measurement robot 40 to control the measurement robot 40.

The controller 50 compares the signal output from each vision sensor 41 with a predetermined value and measures the gaps/height differences between the vehicle body 10 and the respective panels 11, 13, 15, and 17 to be measured to judge whether the gaps/height differences are normal.

Hereinafter, an operation and control method of the gap/height measurement system for a vehicle according to the exemplary embodiment of the present invention having the above configuration will be described.

FIG. 2 is a control flowchart for describing a control method of a gap/height difference measurement system for a vehicle according to another exemplary embodiment of the present invention.

A control method of a gap/height difference measurement system for a vehicle, is installed on a transportation conveyor line 20 through which a vehicle body 10 in which assembling respective panels 11, 13, 15, and 17 of a roof 11 a hood 13, a door 15, and a trunk lead 17 is completed is transported to measure a gap/a height difference between the respective panels 11, 13, 15, and 17 and the vehicle body 10 includes: (a) recognizing the vehicle body 10 depending on information transmitted to a controller 50 when the vehicle body 10 is transported on the transportation conveyor line 20 and sensing vehicle body brightness through reflection light reflected depending on illuminance of an illumination from the vehicle body through a sensor 33 of a reflection light sensing unit 30 to output the signal to the controller 50, (b) comparing the signal output from the sensor 33 of the reflection light sensing unit 30 with a predetermined value and judging a difference between reference brightness and the vehicle body brightness during the step to control the illuminance of the illumination, and (c) measuring the gap/height difference between the vehicle body 10 transported on the transportation conveyor line 20 and the vehicle body 10 of the respective panels 11, 13, 15, and 17 by using a measurement robot 40 depending on the difference between the reference brightness and the vehicle body brightness judged during the step, and terminating a control.

First, when the vehicle body 10 in which assembling the respective panels 11, 13, 15, and 17 is completed enters the transportation conveyor line 20 and is transported (S1), a vehicle type of the vehicle body 10 is recognized through the information received by the controller 50 (S2), and the reflection light reflected from the vehicle body 10 is sensed by the sensor 33 of the reflection light sensing unit 30 and output to the controller 50 depending on illuminance of the illumination 60 (S3).

Herein, the illumination 60 may be constituted by a laser illumination that radiates laser light to the vehicle body 10 and the sensor 33 of the reflection light sensing unit 30 may be constituted by a light receiving sensor that senses the reflection light reflected from the vehicle body 10.

Thereafter, the controller 50 judges a difference between predetermined reference brightness and measured vehicle body brightness from the signal output from the sensor 33 of the reflection light sensing unit 30 (S4).

When the controller 50 judges that there is the difference between the predetermined reference brightness and the vehicle body brightness (that is, when a condition is not met), the controller 50 controls the illuminance of the illumination 60 (S5) and repeatedly performs the aforementioned step by returning to the sensing the reflection light reflected from the vehicle body 10 through the reflection light sensing unit 30 and outputting the sensed reflection light to the controller 50 (S3) again.

On the contrary, when there is no difference between the predetermined reference brightness set in the controller 50 and the vehicle body brightness measured by the reflection light sensing unit 30 (that is, when the condition is met), it is judged that measurement preparation is completed, the gaps/height differences between the vehicle body 10 and the respective panels 11, 13, 15, and 17 transported on the transportation conveyor line 20 are measured by actuating the measurement robot 40 (S6), and the control is terminated.

Herein, the vision sensor 41 is mounted on a front end of the measurement robot 40, and the signal sensed by the vision sensor 41 is output to the controller 50 to measure the gaps/height differences between the vehicle body 10 and the respective panels 11, 13, 15, and 17.

The gap/height difference measurement system 1 for a vehicle according to the exemplary embodiment of the present invention automatically measures the gap/height difference of the vehicle body 10 of which assembling is completed, which moves on the transportation conveyor line 20 and the controller 50 compares the measurement value output from the measurement robot 40 with a predetermined value to judges whether the gap/height difference of the vehicle body 10 to be measured is erroneous and classifies the vehicle body 10 into a passed product and a failed product.

Accordingly, according to the gap/height difference measurement system 1 for a vehicle and the control method thereof according to the exemplary embodiments of the present invention configured as above, the brightness of the illumination is automatically controlled depending on the vehicle type, the color, and the gloss of the vehicle body 10 in which assembling the various panels 11, 13, 15, and 17 of the roof 11, the hood 13, the door 15, and the trunk lead 17 is completed prevent generation of diffused reflection and a shortage phenomenon of a light intensity by a difference in illuminance of the illumination 60, thereby automatically measuring the gaps/height differences between the vehicle body 10 and the respective panels 11, 13, 15, and 17, and as a result, measurement reliability may be improved by automatically and accurately measuring the gaps and the height differences between the vehicle body 10 and the respective panels 11, 13, 15, and 17 which are mounted regardless of the vehicle type, and the color and gloss of the vehicle body 10.

Further, the present invention may be commonly applied to various vehicle types regardless of the vehicle type, the color, and the gloss, and the gap/height difference is automatically measured without stopping the vehicle body 10 that moves through the transportation conveyor line 20, and as a result, productivity may be improved by shortening a measurement time.

In an exemplary embodiment of the present invention, the illumination includes a laser type, and the laser type illumination adjusts its own laser density to be able to detect the gap and the height difference (flushness) of the vehicle body.

Further, the height difference can be called as "flushness" in an exemplary embodiment of the present invention.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A gap/height difference measurement system for a vehicle, which is installed on a transportation conveyor line through which a vehicle body, of which each panel is assembled, is transported to measure a gap and/or a height difference between the each panel and the vehicle body, the system comprising:
    a reflection light sensing unit sensing reflection light reflected from the vehicle body transported depending on illuminance of an illumination;
    a measurement robot measuring the gap and/or the height difference between the vehicle body and the each panel; and
    a controller receiving a signal sensed by the reflection light sensing unit and comparing the signal with a predetermined value to control the illuminance of the illumination, and outputting a specification depending on a vehicle type of the vehicle body transported to the measurement robot to control the measurement robot when there is no difference between the predetermined value and the signal.

2. The system of claim 1, wherein the reflection light sensing unit includes:
    a mounting frame installed at one side of the transportation conveyor line; and
    at least one sensor mounted on an interior of the mounting frame to correspond to the vehicle body, and receiving the reflection light reflected from the vehicle body and outputting the signal to the controller.

3. The system of claim 2, wherein the at least one sensor includes a light receiving sensor, and is mounted on each of an upper inner part and both lateral parts of the mounting frame to correspond to a top and both lateral surfaces of the vehicle body, respectively.

4. The system of claim 1, wherein the illumination includes a laser illumination that radiates laser light to the vehicle body.

5. The system of claim 1, wherein the measurement robot has a vision sensor mounted on a front end thereof, and outputting a signal sensed by the vision sensor to the controller to measure the gap and/or the height difference between the vehicle body and the each panel.

6. The system of claim 5, wherein the controller is configured to compare the signal output from the vision sensor with a predetermined value and measures the gap and the height difference between the vehicle body and the each panel to be measured to judge whether the gap and/or the height difference is normal.

7. The system of claim 4, wherein the laser type illumination adjusts its own laser density.

8. A control method of a gap/height difference measurement system for a vehicle, which is installed on a transportation conveyor line through which a vehicle body of which each panel is assembled, is transported to measure a gap and/or a height difference between the each panel and the vehicle body, the method comprising:
    a step (a) of recognizing the vehicle body depending on information transmitted to a controller when the vehicle body is transported on the transportation conveyor line and sensing vehicle body brightness through reflection light reflected depending on illuminance of an illumination from the vehicle body through a sensor of a reflection light sensing unit to output a signal to the controller;
    a step (b) of comparing the signal output from the sensor of the reflection light sensing unit with a predetermined value and judging a difference between predetermined reference brightness and the vehicle body brightness to control the illuminance of the illumination; and
    a step (c) of determining the gap and/or the height difference between the vehicle body transported on the transportation conveyor line and the each panel by using a measurement robot depending on the difference between the reference brightness and the vehicle body brightness, and terminating a control.

9. The method of claim 8, wherein the step (a) includes:
    conveying the vehicle body by the transportation conveyor line;
    recognizing a vehicle type of the vehicle body through the information received by the controller; and
    sensing the reflection light reflected from the vehicle body depending on the illuminance of the illumination through the reflection light sensing unit and outputting the signal of the reflection light to the controller.

10. The method of claim 9, wherein the step (b) includes:
    judging the difference between the predetermined reference brightness and the vehicle body brightness from the signal output from the reflection light sensing unit;
    controlling the illuminance of the illumination when there is the difference between the predetermined reference brightness and the vehicle body brightness; and
    sensing the reflection light reflected from the vehicle body through the reflection light sensing unit and outputting a sensed reflection light to the controller when the step (b) is completed again.

11. The method of claim 8, wherein the step (c) includes:
judging that measurement preparation is completed when there is no difference between the predetermined reference brightness and the vehicle body brightness measured through the reflection light sensing unit by the controller; and determining the gap and/or the height difference between the vehicle body and the each panel transported on the transportation conveyor line by actuating the measurement robot, and terminating the control.

12. The method of claim 8, wherein the illumination includes a laser illumination that radiates laser light to the vehicle body.

13. The method of claim 8, wherein the sensor of the reflection light sensing unit includes a light receiving sensor sensing the reflection light reflected from the vehicle body.

14. The method of claim 8, wherein the measurement robot has a vision sensor mounted on a front end thereof, and outputs a signal sensed by the vision sensor to the controller to measure the gap and/or the height difference between the vehicle body and the each panel.

* * * * *